United States Patent
Reinartz et al.

[11] Patent Number: 5,722,742
[45] Date of Patent: Mar. 3, 1998

[54] ELECTROHYDRAULIC PRESSURE CONTROL MECHANISM

[75] Inventors: Hans-Dieter Reinartz, Frankfurt am Main; Dieter Dinkel, Eppstein/Ts; Helmut Steffes, Hattersheim, all of Germany

[73] Assignee: ITT Automotive Europe GmbH, Germany

[21] Appl. No.: 586,745

[22] PCT Filed: Jul. 20, 1994

[86] PCT No.: PCT/EP94/02379

§ 371 Date: May 6, 1996

§ 102(e) Date: May 6, 1996

[87] PCT Pub. No.: WO95/03960

PCT Pub. Date: Feb. 9, 1995

[30] Foreign Application Priority Data

Jul. 29, 1993 [DE] Germany .............. 43 25 410.1

[51] Int. Cl.⁶ .................. B60T 13/66; B60T 8/36
[52] U.S. Cl. .................. 303/119.2; 303/113.1
[58] Field of Search .............. 303/119.2, 119.1, 303/113.1; 137/884; 251/129.15; 439/34; 335/202, 278

[56] References Cited

U.S. PATENT DOCUMENTS

| | | | |
|---|---|---|---|
| 5,040,853 | 8/1991 | Burgdorf et al. | 303/119.2 |
| 5,127,440 | 7/1992 | Maas et al. | 303/119.2 |
| 5,275,478 | 1/1994 | Schmitt et al. | 303/119.2 |
| 5,362,141 | 11/1994 | Beck et al. | 303/119.2 |
| 5,520,447 | 5/1996 | Burgdorf et al. | 303/119.2 |

FOREIGN PATENT DOCUMENTS

| | | |
|---|---|---|
| 0499670 | 8/1992 | European Pat. Off. |
| 3725385 | 2/1989 | Germany . |
| 4135745 | 5/1993 | Germany . |
| WO8905746 | 6/1989 | WIPO . |
| WO9212878 | 8/1992 | WIPO . |

OTHER PUBLICATIONS

Search Report of the German Patent Office for Application P4325410.1.

Richl, Helmuth: Trends bei der Entwicklung von Hydraulik-Ventilmagneten. In: O+P Olhydraulik und Pneumatik 35, 1991, Nr. 8, S.613–619.

*Primary Examiner*—Douglas C. Butler
*Attorney, Agent, or Firm*—Thomas N. Twomey; J. Gordon Lewis

[57] ABSTRACT

An electrohydraulic pressure control mechanism, with electromagnetically controllable hydraulic valves arrayed on a valve housing, with coils which have some of their parts overhanging the valve housing, and the parts being equipped with contact elements. A molding box enclosing the coils and the contact elements, with the molding box or part thereof being suitable for installation of an electronic controller or parts of terminals for such. The molding box featuring cavities extending from its set-down surface on the valve housing to the far outer surface of the molding box; and the cavities taking on the form of lead-through opening in the proximity of coils. This assures a simplified attachment of coil casings to the valve domes.

7 Claims, 2 Drawing Sheets

ELECTROHYDRAULIC PRESSURE CONTROL MECHANISM

TECHNICAL FIELD

The invention refers to an electrohydraulic pressure control mechanism, and more specifically to a brake retarder pressure control mechanism.

BACKGROUND OF THE INVENTION

An electrohydraulic pressure control mechanism of generic designation is, for instance, described in the international publication WO 92/12878. Here, aside from the commonly known modular assembly of the valve housing, the lid is sectioned by way of a flat panel support element. This design serves the purpose of accommodating an electronic regulator or parts thereof and, secondarily, it establishes an electric connection between the electronic regulator and the overhead contact elements of the electromagnetic valves. The lid, along with the coils of the electromagnetic valves, is attached to the valve domes of the valve housing. Insert contacts lock to bring about an electric connection between the contact elements and the electronic or electric components now integrated in the lid. Recommended fastening of the coils to the support element is achieved by the use of elastic mounts, as there are springs, to embed the coils into an elastic molding box. However, the implement of an elastic molding box proves to be unduly cumbersome in terms of the required task.

It is the object of the innovation to improve the conventional state of technology pressure control mechanism. The goal is to achieve a simplified coil configuration and to arrive at a compact, yet functionally optimal coil arrangement to harmonize with the support element. Additionally, the invention provides ease of manufacture and maintenance, with differing thermal expansions of assembly components and their respective tolerances being compensated for in a stress-free fashion.

It is proposed to have the molding box contain cavities fully extending from the mold box's set-down surface on the valve housing to the mold box's surface farthest removed from the valve housing and which, in proximity of the coils, appear as lead-through openings.

DETAILED DESCRIPTION OF THE DRAWINGS

Figure 1:
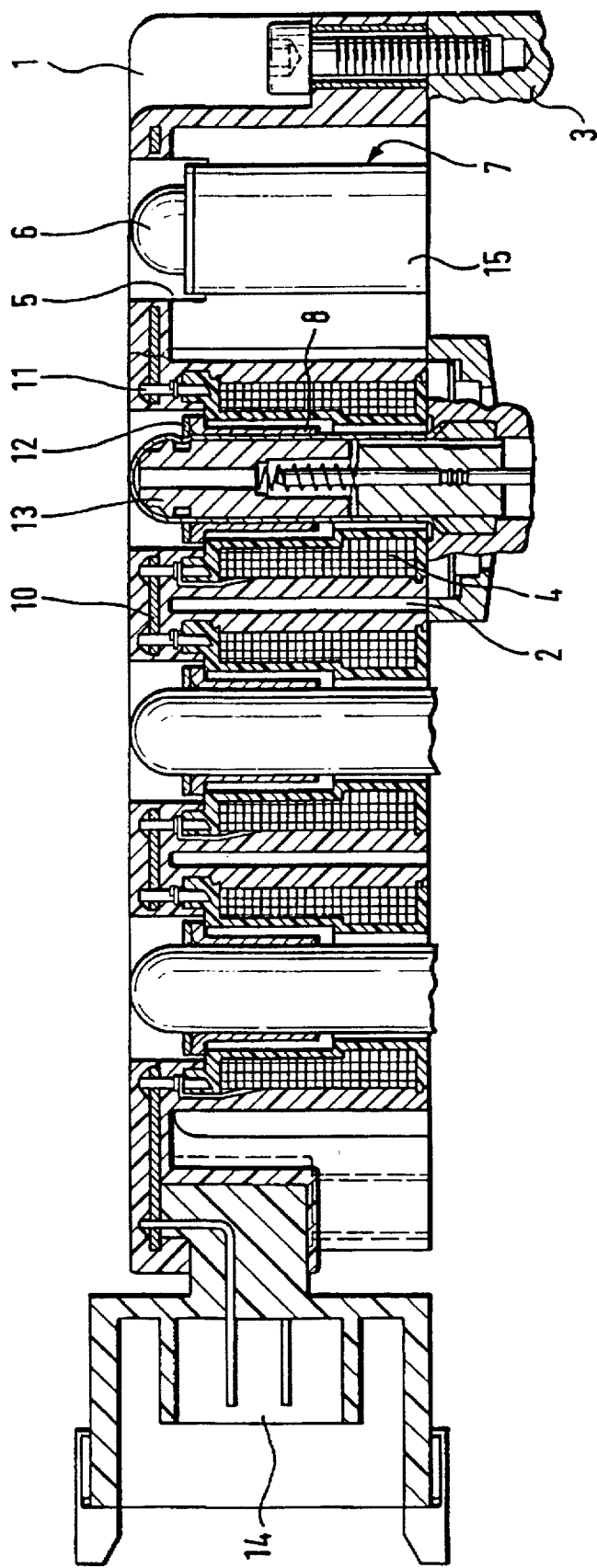
FIG. 1 a longitudinal section of the pressure control mechanism of the present invention.

FIG. 1 shows a side projection of the pressure control mechanism with a sketch of its basic components. The longitudinal section shown extends along a valve row's valve dome axis. For emphasis on the coil casing 7, the intersection in proximity of the outer right electromagnetic valve has been shifted to molding box 1 (also compare subsequent FIG. 2). Molding box 1, fastened onto valve housing 3, consists of a high-viscosity plastic substance which, through a device, sprays or laminates around coils once the strip conductors (tracks) 10 and/or printed circuits are soldered to the contact elements 11 above coils 4. The plastics of the molding box and the plastics of the coil casing thus protect the strip conductors 10 and coils 4. To accommodate valve dome 6, molding box 1 provides liberally-proportioned lead-throughs to facilitate a sufficient radial tolerance compensation between molding box 1 and valve dome 6—in order to have molding box 1 (containing coils 4) fit easily over valve domes 6 to come to rest on valve housing 3. The lead-through openings 5 in molding box 1 are proportioned so that coil casing 7, opposite coils 4, can be comfortably fit onto valve domes 6 and, for instance, can be secured with a gripper ring 12. For this purpose, coil casing 7 need not be totally enclosed; instead, side recesses 9 lend coil casing 7 an open profile in the form of an U-leg. Within contact range of valve dome 6, the coil casing 7 takes on the shape of a bush 8, assuming the function of a yoke ring. Hence, following installation of molding box 1, and coil casing 7 on valve housing 3 over magnetic core 13, the magnetic circuit is closed.

Cavities 2 and lead-through openings 5 on molding box 1 contribute to weight and material reductions and bridge varying mechanical and thermal tolerances of components between valve housing 3 and molding box 1 in a stress-free fashion. Each coil casing 7 of valve housing 3 is governed exclusively by its respective valve dome and exhibits sufficient radial play relative to coils 4 and molding box 1 to guarantee at any time—regardless of assembly component tolerances—proper coil location on the valve housing. In FIG. 1 the insert terminal 14 is integrally sprayed or laminated with molding box 1, affording a relatively easy electric connection to the periphery.

Figure 2:
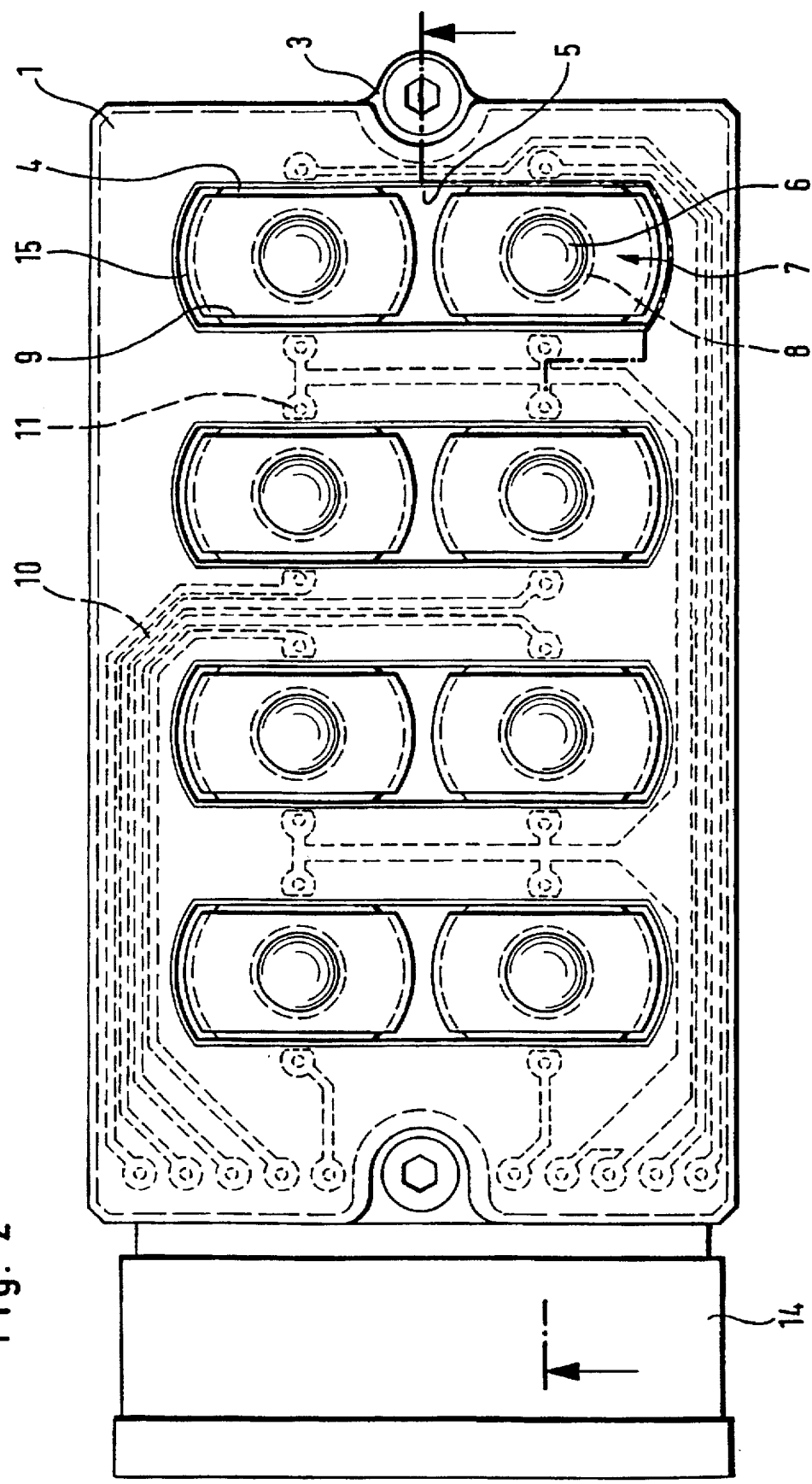
FIG. 2 a top view of the pressure control mechanism, depicted in FIG. 1.

FIG. 2 shows a top view of the pressure control mechanism with the molding box 1 and part of the electromagnetic valves visible following installation on valve housing 3. The strip conductors (tracks) embedded in molding box 1 are indicated as in dash lines. It refers to a pressure control mechanism with electromagnetic valves, divided in 2 rows of four across. The magnetic valve row, shown in longitudinal section in FIG. 1 represents closed hydraulic valves in an electromagnetically unexcited basic position, which is identical to the valve row in FIG. 2. The opposite valve row represents open hydraulic valves in an electromagnetically excited basic position. The depicted hydraulic valves in their entirety can be connected to the wheel brakes and brake pressure initiator of a slip-controlled braking system. This takes place over several hydraulic brake pressure lines and runoff lines not visually specific represented here. Easily recognizable are the liberally designed elongated lead-through openings 5 in molding box 1; also coil casings 7 and their—in top view—flattenings (symmetrically distributed over respective coil circumferences) which conform to recesses 9, in order for the filler mass of coil 4 to become visible in lead-through openings 5. The filler mass of coils 4 is enclosed segmentally by the material of molding box 1. The top view also reveals the dash-lined wall thickness of bush 8, constituting the yoke ring. Bush 8 is a single-piece connection with the steel-made coil casing 7, extending along the valve dome walls. Also shown as a dash-line is the wall thickness of the bifurcated or U-shaped crimped legs of coil casing 7.

In summation it can be stated that the invention reduces the requirement for filler mass and/or sealer to a minimum, eliminating the task of extensive spraying or reforging of coils 4. Cleaning, and problems of deformation are similarly reduced to a minimum during manufacture. Molding box 1 and the sealer of coils 4 form a simple-to-produce entity, while the coils 4 (on account of the sealer) firmly connect to molding box 1. Contact elements 11 on strip conductors 10 are embedded within the molding box 1. By use of simple-to-manufacture coil casings which are inserted (after installation of molding box 1 on valve housing 3) into valve domes 6 by way of lead-through openings 5, the proper positioning—independent of component tolerances—of coils 4 on valve domes 6 is achieved. The horizontal and vertical distance of coils relative to valve domes 6 can be liberally proportioned, simplifying the installation of the electrical assembly on valve housing 3 considerably.

We claim:

1. Electrohydraulic control mechanism, of the type including electromagnetic, hydraulic valves arrayed on a valve housing wherein the valves include coils, which in part overhang the valve housing, coil casings covering said coils, said overhanging coils equipped with contact elements, a molding box enclosing the coils and contact elements, comprising:

cavities formed in said molding box which fully extend from a first surface of said molding box to a second surface of said molding box, wherein said second surface of said molding box faces the valve housing, wherein said cavities form openings in said molding box, said openings being sufficiently large to accommodate the passage of said coils and coil casings therethrough to allow said coil casing to be easily attached to a valve dome.

2. Electrohydraulic pressure control mechanism, according to claim 1, wherein each lead-through opening contains a coil casing.

3. Electrohydraulic pressure control mechanism, according to claim 2, wherein the coil casing is formed as a bush on the front end away from the valve housing, extending from the outside area of the coil to the inside area of the coil, and wherein the bush is attachable to the transitional area on the front end of the coil and on the inside area of the valve dome.

4. Electrohydraulic pressure control mechanism, according to claim 3, wherein the coil casing featuring along a circumferential surface partial recesses having a U-shaped profile.

5. Electrohydraulic pressure control mechanism according to claim 4, wherein the coil casing includes a shank which extends between the recesses and the valve housing.

6. Electrohydraulic pressure control mechanism, according to claim 1, wherein said molding box includes a cavity between coils, wherein said cavity extends between a first surface of the molding box to a strip conductor embedded in the molding box.

7. Electrohydraulic pressure control device, according to claim 1, wherein the coils are partially enclosed in their circumference by the molding box, with the non-covered coil sections consisting of the lead-through openings.

* * * * *